Oct. 17, 1944.　　　　H. P. MIXER　　　　2,360,615
COMPUTING MACHINE
Filed Nov. 12, 1941　　　8 Sheets-Sheet 1

INVENTOR
HAROLD P. MIXER
BY
ATTORNEY

Oct. 17, 1944.     H. P. MIXER     2,360,615
COMPUTING MACHINE
Filed Nov. 12, 1941     8 Sheets-Sheet 4

INVENTOR
HAROLD P MIXER
BY John L Sterling
ATTORNEY

Oct. 17, 1944.                H. P. MIXER                2,360,615
                          COMPUTING MACHINE
                        Filed Nov. 12, 1941            8 Sheets-Sheet 5
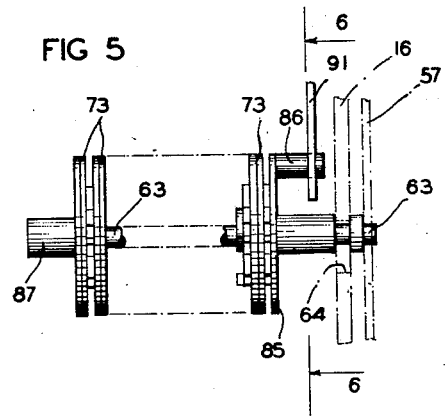
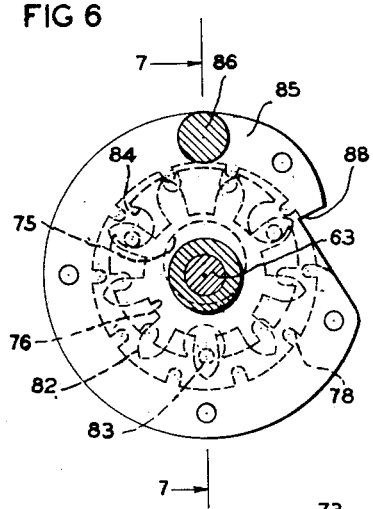
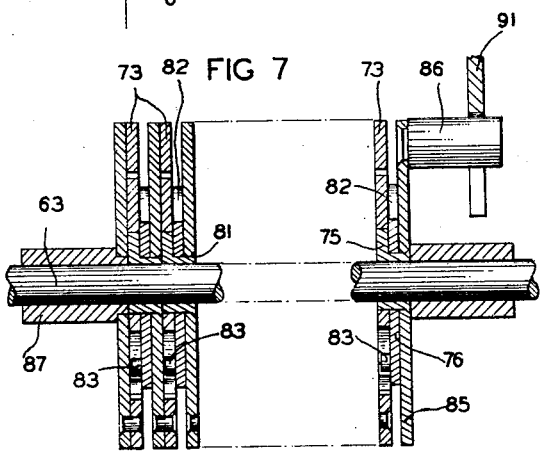
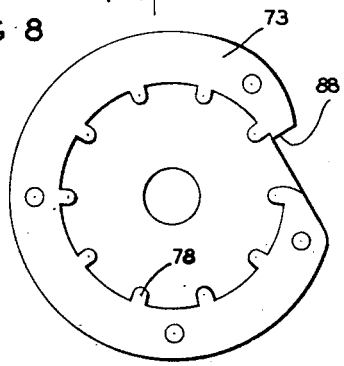
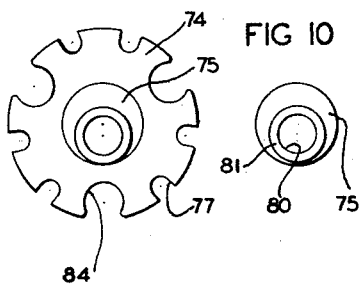
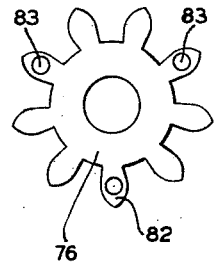
INVENTOR
HAROLD P. MIXER
BY *John L. Sterling*
ATTORNEY Oct. 17, 1944.    H. P. MIXER    2,360,615
COMPUTING MACHINE
Filed Nov. 12, 1941    8 Sheets-Sheet 6
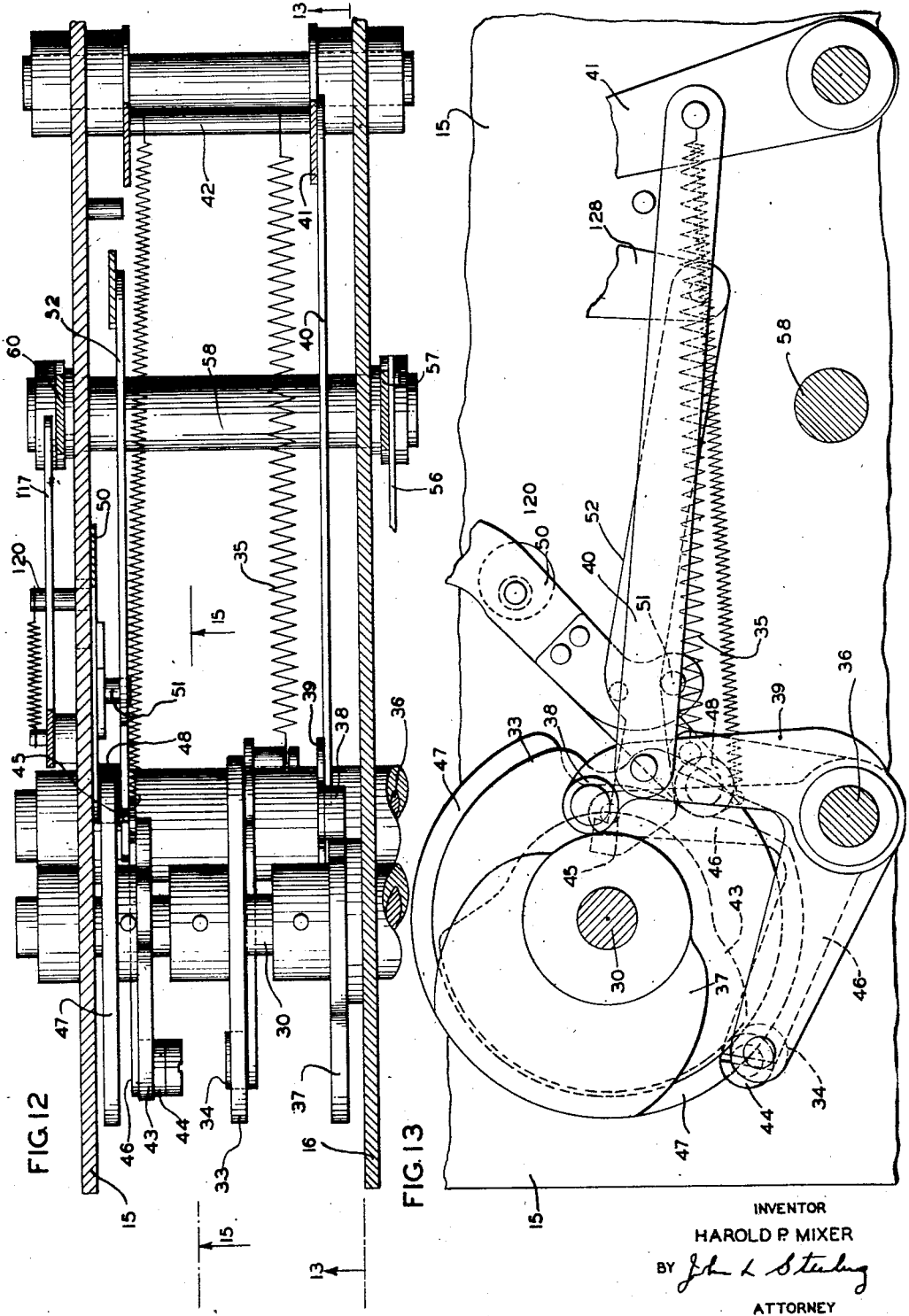
INVENTOR
HAROLD P. MIXER
BY John L. Sterling
ATTORNEY Oct. 17, 1944.　　　H. P. MIXER　　　2,360,615
COMPUTING MACHINE
Filed Nov. 12, 1941　　　8 Sheets-Sheet 7
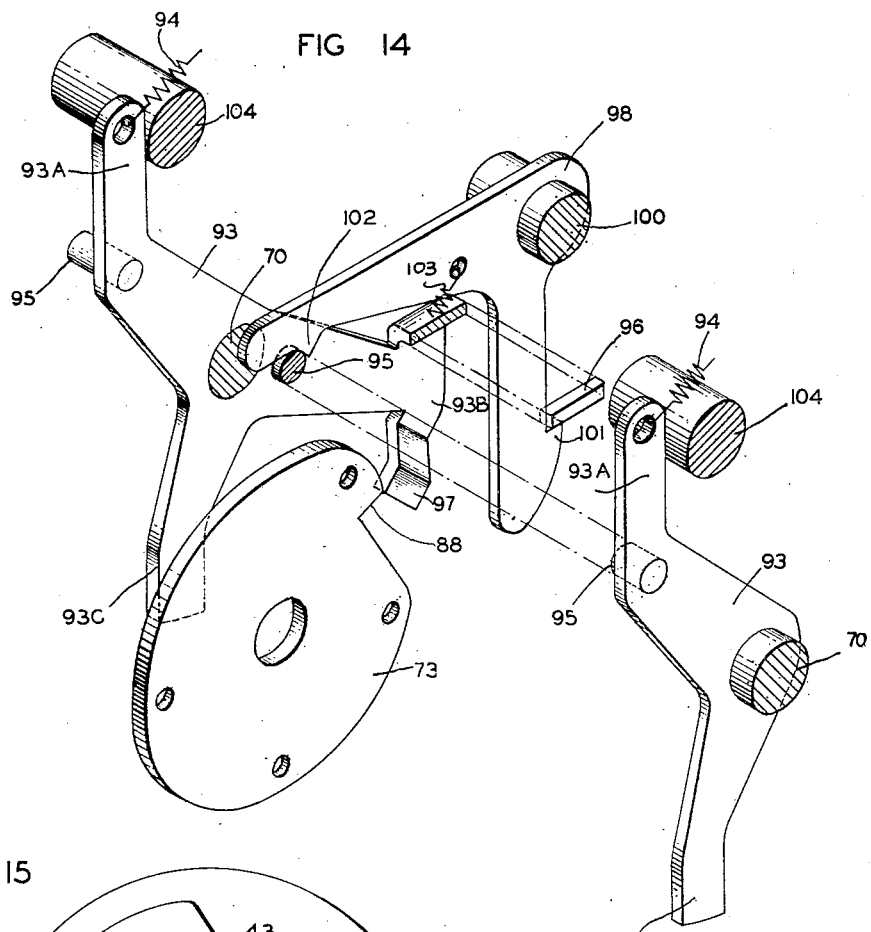
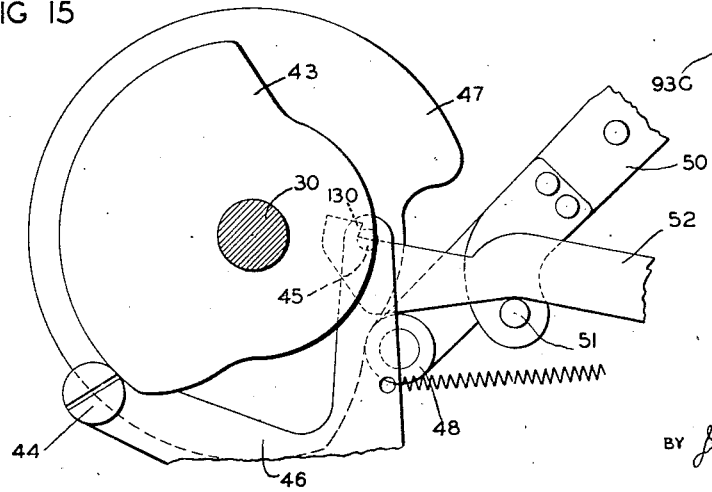
INVENTOR
HAROLD P MIXER
BY John L Sterling
ATTORNEY Oct. 17, 1944. H. P. MIXER 2,360,615
COMPUTING MACHINE
Filed Nov. 12, 1941    8 Sheets-Sheet 8

INVENTOR
HAROLD P. MIXER
BY
ATTORNEY

Patented Oct. 17, 1944

2,360,615

UNITED STATES PATENT OFFICE 2,360,615

COMPUTING MACHINE

Harold P. Mixer, Rockville Centre, N. Y., assignor to Remington Rand Inc., Buffalo, N. Y., a corporation of Delaware Application November 12, 1941, Serial No. 418,796

9 Claims. (Cl. 235—60)

The invention relates to computing machines employing creep carry accumulator units.

The invention claimed herein has for its principal object to improve the means for zeroizing a creep carry accumulator in the taking of totals. The several wheels are zeroized in rapid succession, the invention resulting in a considerable simplification of and improvement in mechanism of this character.

The invention resides in certain features of construction and combinations and arrangements of parts, all of which will be fully described herein and particularly pointed out in the claims.

There is also described herein an improvement in the accumulator itself, resulting in a reduction in the spacing of the wheels in right and left hand direction, to the point where such spacing is no greater than that ordinarily given to the printing. This improvement has been made the subject matter of a divisional application, Serial No. 493,987, filed July 9, 1943.

Other objects and structural details of the invention will be apparent from the following description when read in connection with the accompanying drawings, wherein Fig. 1 is a plan view of the complete calculating machine with the exception of the printing platen;

Fig. 5 is an elevational view of the accumulator;

Fig. 6 is a sectional view of the accumulator taken along line 6—6 of Fig. 5;

Fig. 7 is a cross sectional view of the accumulator taken along line 7—7 of Fig. 6;

Fig. 8 is an elevational view of the internal gear which is one of the components of each accumulator order;

Fig. 9 is an elevational view of the floating gear which meshes with the internal gear;

Fig. 10 shows the sleeve and eccentric;

Fig. 11 shows the nine tooth numeral gear;

Fig. 12 is a cross sectional view of the machine taken along line 12—12 of Fig. 2 and shows the mounting of the main operating cams;

Fig. 13 is a cross sectional view of the lower part of the machine taken along line 13—13 of Fig. 12;

Fig. 14 is an exploded isometric view of the accumulator latch mechanism;

Fig. 15 is a cross sectional view taken along line 15—15 of Fig. 12, and

Figure 1:
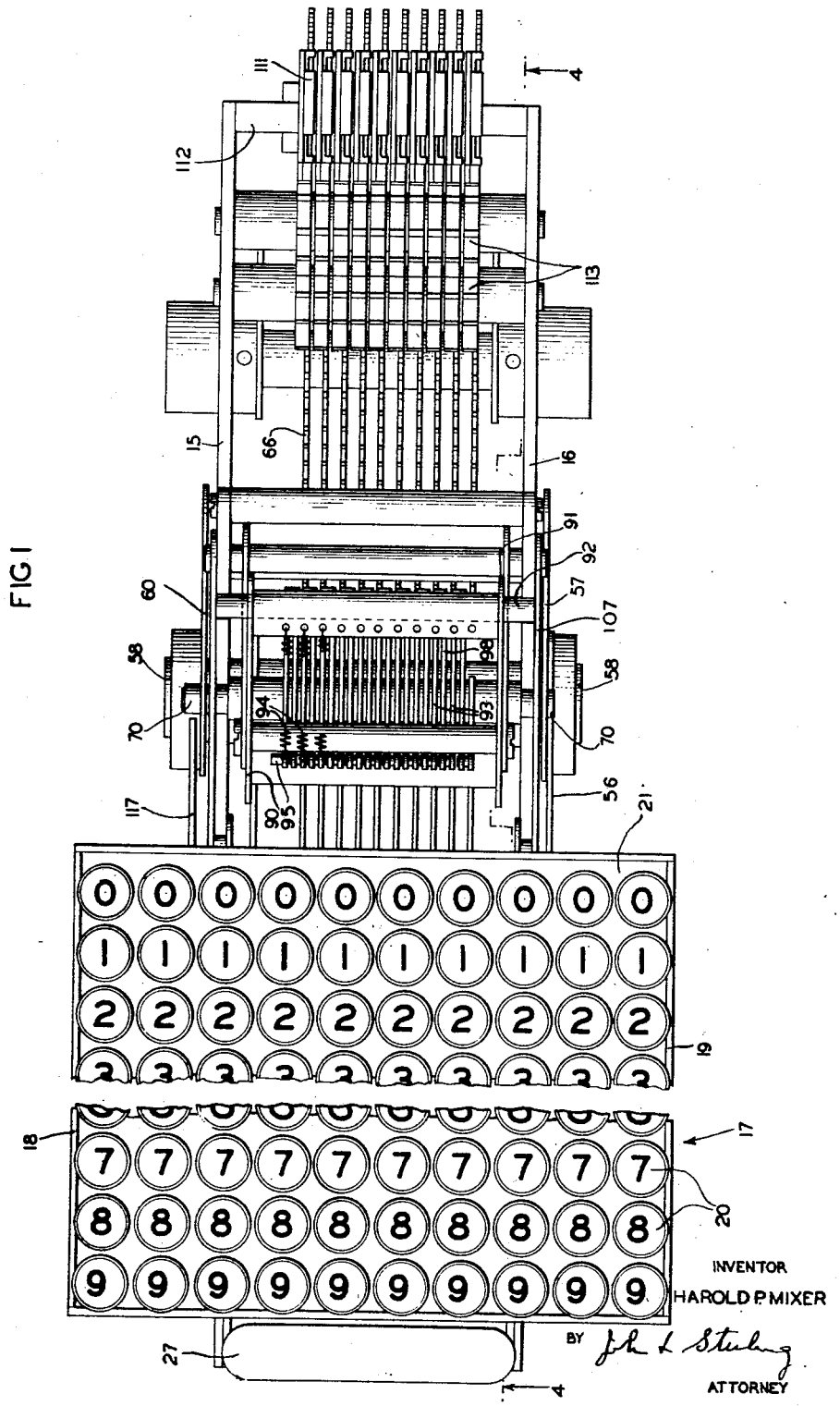

Referring now to Figs. 1, 2, 3, and 4, the moving parts of the calculating machine are supported by two side frame pieces 15 and 16. A conventional type of keyboard 17 is attached at the front part of the machine and is firmly secured to the side plates by supporting brackets 18 and 19. A plurality of rows of numeral keys 20, one row for each denominational order, are mounted in a frame comprising an inclined perforated plate 21 and held in their unoperated position by a series of springs 22. When one of the keys 20 is manually depressed, the associated stem 23 (Fig. 4) depresses its associated stop bar 24 which is then retained in its depressed position by latch plate 25 cooperating with pins 26 secured to bars 24. A reset key 27 is positioned at the front edge of the keyboard and is connected to all the latch plates 25 by a series of bell-cranks and pin and slot connections so that the operator may cancel the set-up at any time.

It should be understood that the above described keyboard is exemplary only and any type of keyboard which can be used to position a series of stop bars may be used.

Figure 4:
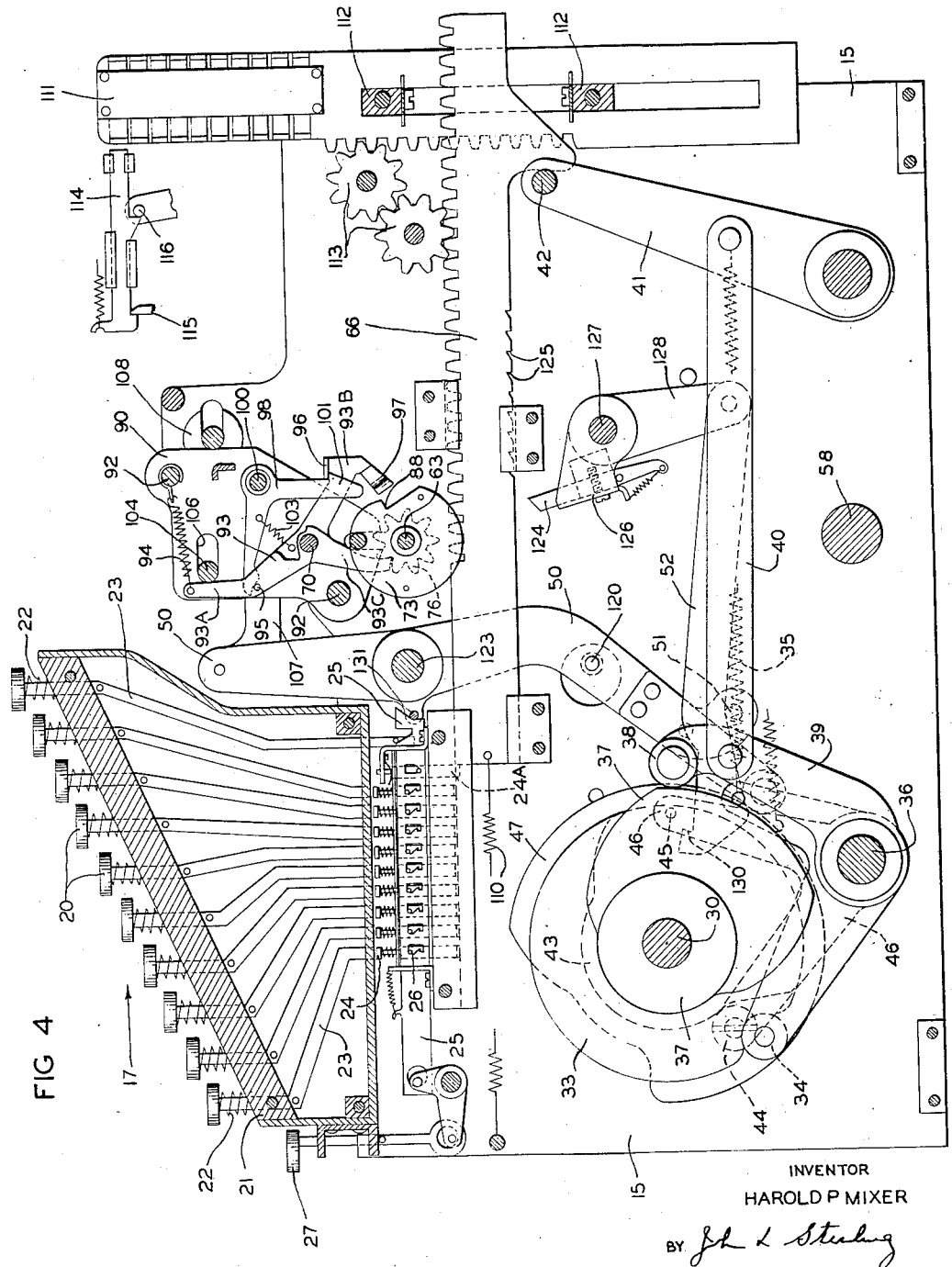
Fig. 4 is a sectional view taken along line 4—4 of Fig. 1.

In the lower part of the machine a drive shaft 30 is mounted horizontally and journaled in the side plates 15 and 16. The shaft 30 extends to the right beyond plate 16, and has secured thereto a crank 31 (Fig. 2) having a handle for manual operation. Shaft 30 supports four cams which control the operation of other parts of the machine as will be described later. A fifth cam 33, also on shaft 30, is employed only as a detent to help in positioning the handle 32 at the end of each operation. A cam follower 34 is drawn by a spring 35 into a notch in the detent cam 33 to provide a stop point at the end of each cycle. In Fig. 4 the various component mechanisms are shown in the start position, a condition which corresponds to the 0° and 360° points in Fig. 16. Below shaft 30 a horizontal bar 36 is positioned by securing it to each side frame and rotatably supports all of the cam follower levers. Each cam follower is stressed into contact with its associated cam by a suitable spring.

A restoring ball cam 37 (Fig. 4) is positioned on the inside of the right-hand frame 16, secured to shaft 30 and controls a cam follower roller 38.

The roller 38 is mounted on a lever arm 39 and operates a link 40 which is pivotally attached to one of the arms 41 of the restoring bail 42. The resulting movements due to cam 37 are indicated on the timing diagram in Fig. 16 by the lines designated "Rack bail."

Also secured to shaft 30 is a pawl control cam 43 which operates a cam follower 44 and thereby causes a lug 45, riveted to the end of arm 46, to be moved forward at the middle of each total taking cycle. Figs. 12 and 13 illustrate this structure more clearly and the detailed operation of this mechanism will be described later.

A total control cam 47 (Fig. 4) is also secured to shaft 30 near the left hand side frame 15 and operates a cam follower 48. The total control cam has two functions, to afford a means of rocking two levers 50 and to shift the position of a lug 51 (see also Figs. 12 and 13) which controls the action of a ratchet link 52 in cooperation with the lug 45.

Outside the main frame to the right of plate 16 (see Fig. 2) an accumulator cam 53 is secured to shaft 30. A cam follower 54, mounted at the end of lever 55, follows the edge of the cam 53 and controls the movement of link 56 which, in turn, is pivoted to a cam lever 57. The cam lever 57 is secured to a shaft 58 which extends through the machine and has a similar cam lever 60 on the left hand side of the machine (Fig. 3). Both cam levers have two cam slots cut in the upper ends thereof which control the movements of the accumulator mechanism. One pair of slots 61 and 62 cooperate to move a small shaft 63 vertically in slots 64 and 65 cut in the side pieces 15 and 16. Shaft 63 acts as a bearing for the accumulator wheels and the vertical movement produced by cam levers 57 and 60 moves the accumulator wheels into and out of mesh with a series of racks 66, shown in Fig. 4.

The upper slots 67 and 68 control the vertical movement of a shaft 70 guided in vertical slots 71 and 72 in the side pieces 15 and 16. This shaft is part of the latch mechanism which controls the totalizing action of the accumulator wheels.

*Accumulator mechanism*

The details of the accumulator mechanism are shown in Figs. 5 to 11, inclusive. Each order comprises four components, an internal resultant gear 73 (Fig. 8), a floating gear 74 (Fig. 9), a sleeve 81 bearing an eccentric 75 (Fig. 10), and a nine tooth numeral gear 76 (Fig. 11). While these four components represent the complete accumulator unit, each sleeve in one unit is secured to the face plate part of the internal gear 73 in the next lower order and, therefore, there are only three moving parts per order. When assembled the floating gear 74 is laid flat against the face plate part of internal gear 73 with its notched periphery 77 in mesh with some of the teeth 78. The eccentric 75 is assembled as indicated in Fig. 7 and holds the nine tooth floating gear in eccentric mesh with the ten tooth internal resultant gear 73. The sleeve 81, by its axial bore 80, is journaled on the accumulator shaft 63. The numeral or driving gear 76 is journaled on the concentric part of the sleeve 81.

The floating gear 74 is driven from the numeral gear 76 by three studs 83 on the latter playing in circular holes 84 in the former, so designed that, as the gears rotate, each stud moves around in contact with the internal periphery of the hole. In the present instance, and preferably, these studs project one from every third tooth 82 of the wheel 76; and each of the holes takes the place of one of the notches or interdental spaces 77 by which the floating gear meshes with the teeth 78 of the internal gear 73. This is practicable because the floating gear and the internal gear are so nearly of the same size that the widening of one of the notches does not prevent proper transmission of the motion, and the interruption of the circular outline of the hole occurs at the dead center position of the stud in the hole, where it is ineffectual as a driving means. The construction is such that at all times at least two of the studs are in position to prevent relative rotation of the numeral and floating gears. This connection between the two eccentrically mounted gears causes them to rotate together with equal angular motions.

The sleeve 81 in the first denominational order is riveted to a plate 85, which is shown at the right hand portions of Figs. 5 and 7. The plate, in turn, is riveted to a lug 86 which cooperates with a slot in the accumulator frame in a manner to prevent rotation of the plate 85. Thus the first order sleeve and eccentric are held stationary in the position indicated in Fig. 7 with the first order numeral gear 76 and the first order floating gear 74 rotating on their respective peripheries.

The last order internal resultant gear 73 is secured to a sleeve 87 which is free to rotate on shaft 63. The general method of operation of this accumulator is the same as that described in U. S. Patent No. 1,828,180 issued to Clyde Gardner, October 20, 1931. Amounts are entered in each denomination by a rack member 66, meshing with the teeth of numeral gear 76 which is concentric with the accumulator shaft 63. The movement of numeral gear 76 is communicated to the entocyclic floating gear 74 by the pin and hole connection 83—84 and this, in turn, moves the resultant gear 73. Since there are nine teeth on gear 74 and ten teeth on gear 73 there will be a ten to nine step down ration of rotary motion, and a complete rotation of numeral gear 76 will advance the internal gear only nine-tenths of a revolution. In order to make a complete revolution of the internal gear equivalent to a ten tooth movement of the numeral gear, only nine teeth are cut on the numeral gear and, therefore, a movement of one tooth of rack 66 will produce a motion of one-tenth of a revolution of resultant gear 73.

As the resultant gear 73 rotates, the eccentric 75 in the next higher order also rotates because the two are riveted together. Assuming that the numeral wheel in the next higher order is held stationary, the floating gear 74 in that order will also be held from rotation but the eccentric motion of the hub will shift the meshing point around the periphery of the higher order internal gear 73, causing it to advance one tooth space, or one-tenth of a revolution, as the eccentric hub moves through one revolution. This ten to one ratio from one resultant gear to the next resultant gear is the familiar tens carry result which is present in similar form in all creep-carry accumulators.

The resultant wheel 73 has a circular periphery interrupted by a notch 88 which has certain functions in total taking and normalizing operations.

ACCUMULATOR CONTROL MECHANISM
(Figs. 4 and 14)

The accumulator control mechanism is mounted on a frame of its own and may be raised and lowered in and out of cooperation with the accumulator. This frame consists of two side pieces 90 and 91 which are mounted by means of cross bars 92 and 70 (Figs. 1, 2, 3, and 4). Vertical movement of the frame is controlled by the cam levers 57 and 60 and cam slots 67 and 68. Three slots in each of the main side frames 15 and 16 guide the accumulator unit as it moves up and down.

Tripping levers 93 are fulcrumed on the cross shaft 70 and stressed by springs 94. With the exception of the lowest order lever, all the tripping levers have three arms, an upwardly extending arm 93A which holds one end of the spring 94, and supports a tripping lug 95, a rearwardly extending stop arm 93B, and a downwardly extending arm 93C used as a detent for the associate numeral wheel 76.

At the rear of stop arm 93B there is formed a bent over portion 96 which may be engaged by a latch and held against rotation. Also, at the bottom of stop arm 93B there is formed a stop 97 which stands clear of the resultant gear 73 when amounts are being entered therein, but which drops into the notch 88 during the readout or total taking operation. The stop 97 is offset from the plane of the tripping lever 93 so that each three-armed lever has its arm 93C engaging a gear 76 and its arm 93B cooperating with the resultant wheel of the next lower order. The first order tripping lever, therefore, has no stop arm since there is no lower order wheel to be engaged.

A series of latches 98 is rockably mounted on a cross shaft 100 in the frame 90, 91, each of said latches having two arms, one extending downwardly and formed with a hook 101 to engage the bent over portion 96 of the arm 93B at the left of it, the second extending toward the front of the machine and formed with a V-shaped cam surface 102 for cooperation with the lug 95 of the arm 93A at its right. A spring 103 urges counter-clockwise rotation as viewed in Figs. 4 and 14.

While amounts are being entered into the accumulator the latch-tripping mechanism is kept disabled by a latch bail 104 which keeps the arms 93A in their forward position, acting against the force of the springs 94. In this position, the latches 98 all assume the position shown in Figs. 4 and 14 by virtue of the pull of springs 103. The latch bail 104 moves in slots 105 and 106 and its position is controlled by the levers 50, 50 and acting through two pairs of links 107 and 108. Said levers are fast on a rock shaft 123.

When a total is to be read out of the accumulator and the entire mechanism normalized, latch bail 104 is moved toward the rear of the machine in its slots 105, 106. Other cam operated devices, to be described later, move the accumulator wheels into mesh with racks 66 and keep the detents 93C in their engaged position.

As soon as the bail 104 is moved to the rear, the lowest order tripping lever 93 rocks on its shaft 70 under action of spring 94 and in so doing cams the latch 98 in a clockwise direction (as seen in Figs. 4 and 14) because of lug 95 acting on the cam surface 102. This action releases the bent-over portion 96 from engagement of hook 101 and, if the resultant gear 73 be in its zero position, as shown in Fig. 14, the stop 97 will drop into the notch 88 and the second order tripping lever will be rocked in the same manner as the first with the same results. A detailed description of the tripping action when a total is being read out of the accumulator will be described hereinafter.

After the operation has been completed for all orders, the accumulator wheels will be in their zero or normal position and the position of the racks will denote the amount which had been entered into the accumulator.

PRINTING MECHANISM

Figure 2:
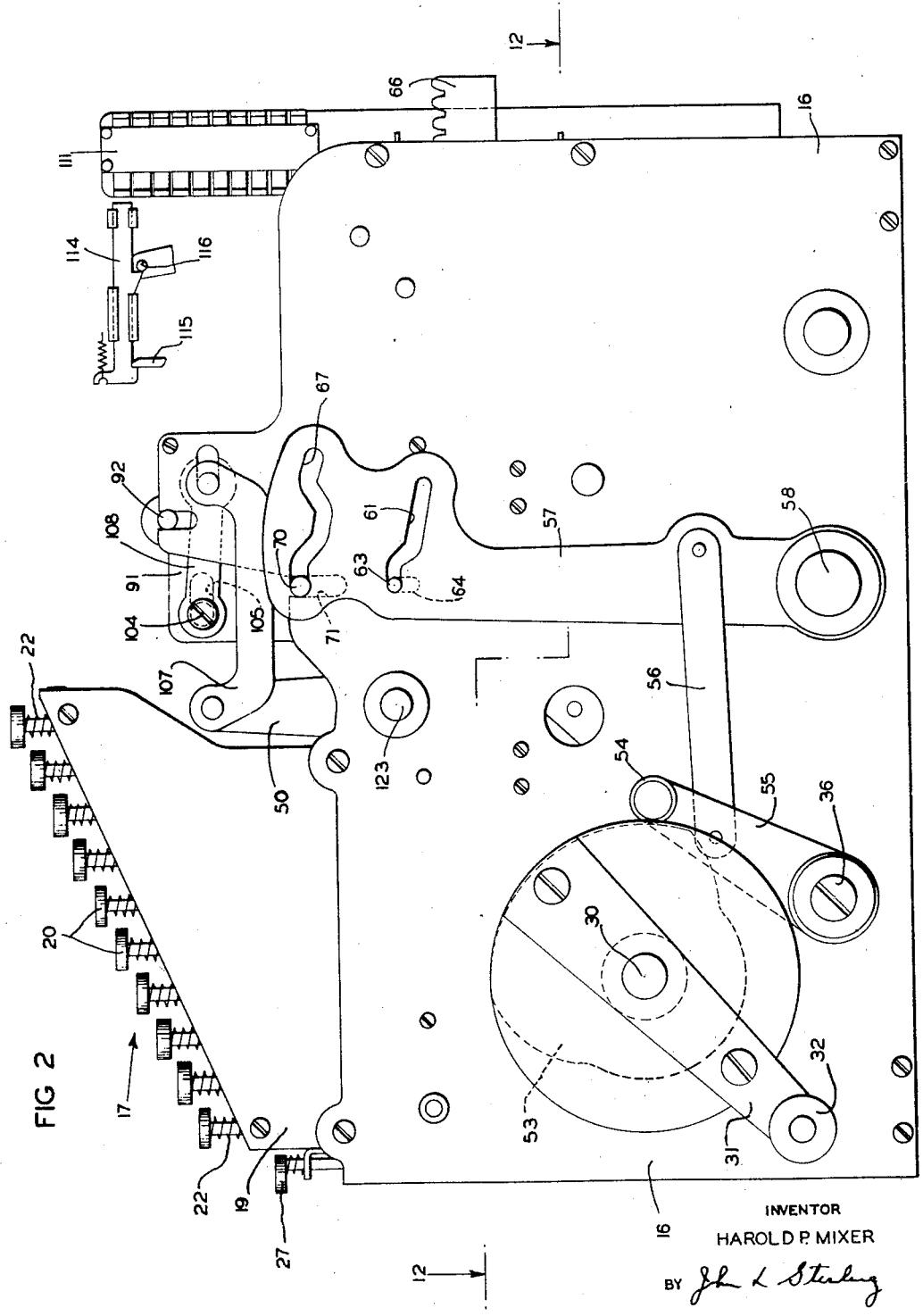
Fig. 2 is a side view of the calculating machine taken from the right, and shows the operating handle and some of the accumulator cams.
Figure 3:
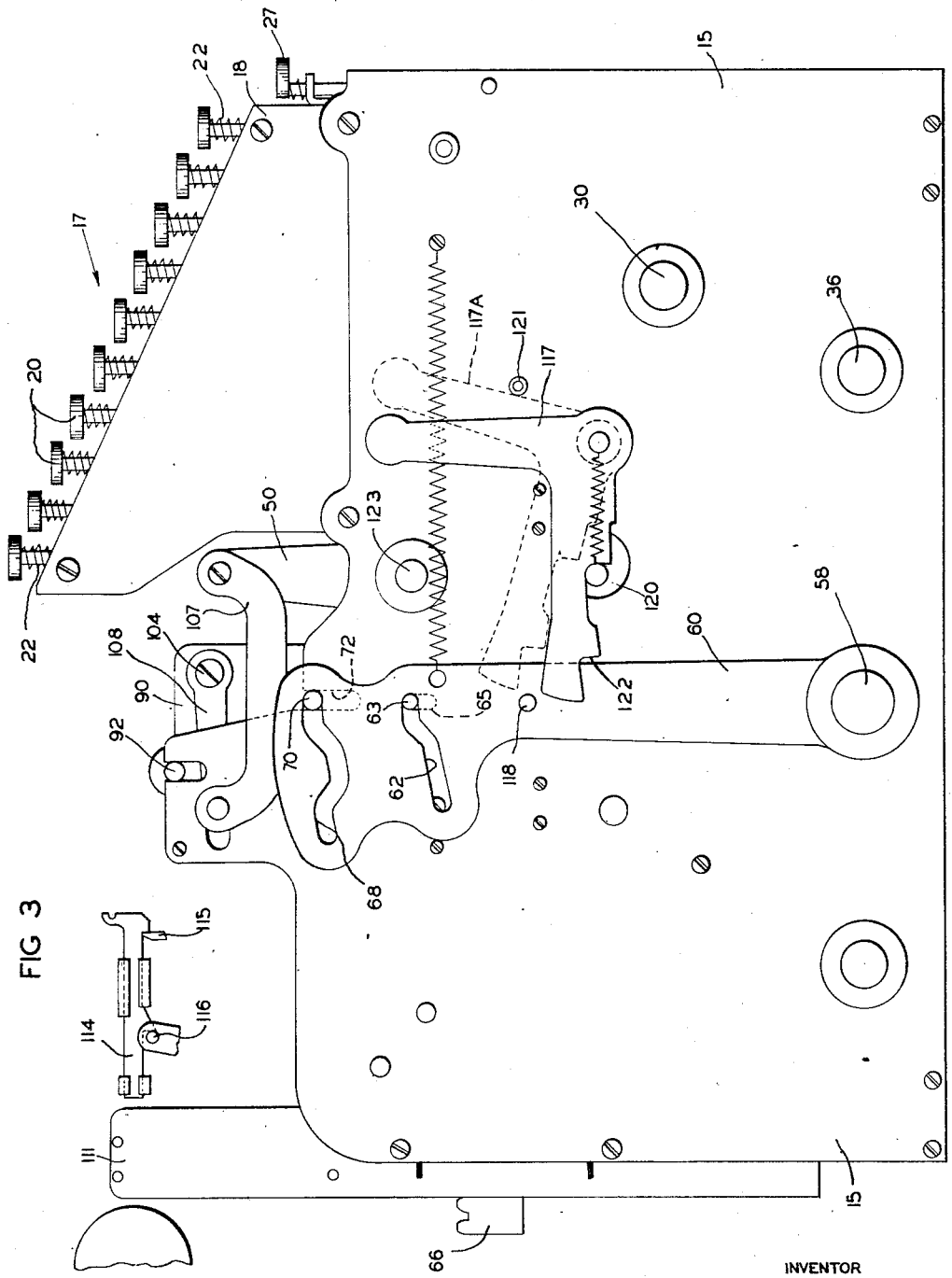
Fig. 3 is similar to Fig. 2 except that it is taken from the left.

The printing mechanism as indicated in Figs. 2, 3, and 4 is exemplary only and any type of recording machine known to the art may be used.

Selection of the proper printing type is made by the provision of a series of type holders 111 which move vertically on cross bars 112 and are permanently geared to the racks 66 by small gears 113. A plurality of printing hammers 114, with their customary release latches 115 and restoring bail 116 are indicated to show how a permanent record may be made. It should be understood that the printing mechanism per se is not part of the invention and any satisfactory method of recording amounts may be used with the present machine.

COMPUTING OPERATION

When it is desired to enter amounts into the machine, the numeral keys 20 are depressed in accordance with the number to be added or subtracted. Each key shank, when operated, depresses the corresponding stop 24 which is thereby latched down by the latch plate 25 and the pin 26 (see Fig. 4). Said latch plate is designed as shown so that when a stop 24 is locked down said plate is held in a position forward of normal. When the latch plate is thus moved forward, a cam slot in it raises a zero bar 24A out of the path of the rack 66 so that the rack may slide under the bar and be limited in its forward movement by the depressed stop 24.

Positive amounts are entered into the accumulator by turning the crank handle 32 in a clockwise direction as viewed in Fig. 2 and negative amounts in the reverse direction. Assuming that the number is to be added, the first movement is caused by cam 37 (Fig. 4) which withdraws the bail rod 42 and permits all released racks 66 to be moved forward to the numerical positions which are determined by the lowered stop pins 24. As may be seen by referring to Fig. 16, this action takes about 80° of crank handle movement. Then the accumulator and the engaged detents 93C are lowered together, the former into engagement with the racks by the cam slots 61, 62, and the latter with them by the cam slots 67, 68 on levers 57 and 60 and soon after, 97° to 110°, the detents are raised by slots 67, 68, leaving the numeral gears in mesh and free to rotate under control of the racks.

During the adding or subtracting cycle a bent control lever 117 is kept in the position indicated by the full lines in Fig. 3 so that a lug 118 on cam lever 60 will pass over the upper surface thereof without hindrance. The lever 117 in this position also restrains a lug 120, which is riveted to the right-hand lever 50 (see Fig. 4), and prevents operation of the release bail 104.

Continued movement of the crank handle in the additive direction produces no results until the 230° position, at which point the rack bail 42 is started on its return toward the rear of the machine. Cam 37 is the actuating means for the motion of the rack bail which picks up the racks and moves them to the normal position, during which movement the accumulator numeral wheels 76 are rotated counter-clockwise (Fig. 4) to enter the correct amounts into the accumulator mechanism.

Figure 16:
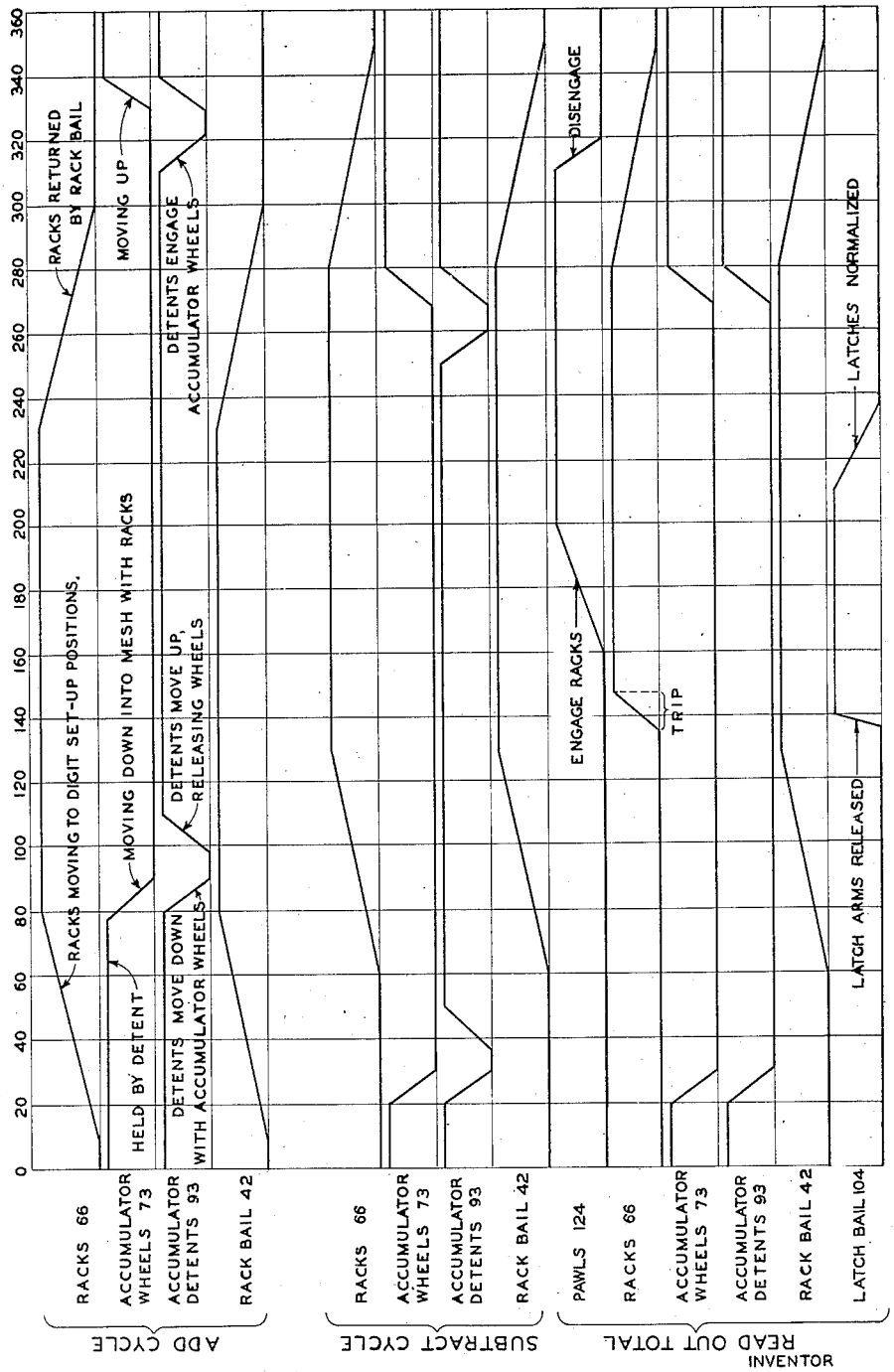
Fig. 16 is a timing diagram which indicates the relative phase of operations of the principal components of the mechanism.

The racks 66 are all returned to normal at the 300° point and 10° thereafter the detents 93 are lowered into mesh with the gears 76 and then at 330° the accumulator and detents are raised out of mesh with the racks (see Fig. 16). The movements of the detents and accumulator wheels are caused by the cam levers 57 and 60 and the cam slots 61, 62, 67, and 68 being returned to their original position as shown in Figs. 2 and 3.

The subtract cycle is similar to the add cycle except that the crank handle is turned counter-clockwise as viewed in Fig. 2 making the timing of the cams on the shaft 30 the converse or reverse of that for addition. The accumulator is moved into mesh with the racks by the same means as before but the meshing movement occurs before the racks are moved to their numerical position. Then, when the racks are moved, the accumulator wheels will be turned in the reverse or subtract direction. As is indicated in Fig. 16, the accumulator wheels are raised (280°) before the racks 66 are returned to their zero position.

READ-OUT OPERATION

When a total is to be read out of the accumulator and the mechanism normalized, the operator shifts the bent lever 117 (Fig. 3) by pulling the top portion thereof toward the front of the machine to the position indicated by the dotted outline 117A where it is arrested by a stop 121. This lifts said lever out of engagement with the pin 120 on one of the levers 50 and (Fig. 4) permits operation of said levers and the restraining bar 104 during the total cycle. It also brings a shoulder 122 of said lever 117 into the path of a lug 118 on the cam lever arm 60, so that, when said lever swings forward, it will move far enough to depress the accumulator shaft 63 and the latch assembly together, but will arrest the arms 60 and 57 before the rear parts of the slots 67 and 68 raise the shaft 70 and the latch assembly.

The total cycle is effected by turning the crank handle in a counter-clockwise direction, the same as the subtract operation. When the crank has been moved 20° the accumulator and the detents 93 are moved down until the numeral gears 76 are in mesh with the racks 66. Due to the blocking of cam levers 60 and 57 by the lever 117, the detents are not moved up again until the end of the cycle. Starting at 60°, the rack bail 42 is moved to the front of the machine (see Fig. 16) and at 135° the latch bail 104 is moved to the rear of the machine due to the motion of levers 50 with rock shaft 123 under control of cam 47. As the levers 50 are rotated, a bail bar 131 carried by arms of the levers 50 is moved upwardly and cams all of the latch bars 25 to the front, thereby releasing all of the stop bars 24 and camming bars 24a out of the paths of the racks 66. Immediately after the movement of the latch bail 104 the lowest order tripping lever 93 (see Fig. 14) will be rocked so as to remove the detent 93c from the first order numeral wheel 76, allowing the latter to be rotated to its zero position under the force of spring 110. The rocking of the lowest order tripping lever also causes the unlatching of the second order lever 93 by rocking the latch 98, due to the camming action of lug 95 on cam surface 102. This action releases the bent-over portion 96 from the hook 101 and, if the units resultant wheel is not in zero position, the stop 97 will be momentarily supported by it and will fall into the notch 88 as soon as the resultant gear 73 is returned to its zero position.

The stop 97 falls into the notch 88 by the rocking of the second order tripping lever 93 in the same manner as the first, the detent point 93c is removed from the second order numeral gear 76 leaving said gear free to rotate and the lug 95 cams the next latch 98 to release the third lever 93 so that its ear 97 may arrest the second order resultant gear 73 at zero. This action continues until all the wheels have been returned to their normal or zero position. During this action the racks 66 have been in mesh with the numeral gears and the springs 110 have furnished the motive power for the zeroizing action. Hence at the end of the operation the racks and printing type will stand at a position corresponding to the total that had been registered on the accumulator.

As each resultant wheel is rotated to its zero position the fractional accumulated crawl caused by that order in the higher orders is also reduced to zero, hence each resultant wheel will have all the fractional crawl movements removed prior to its release.

The time consumed in the zeroizing action varies with the amount transferred into the accumulator. A series of "ones" will be read-out in less than one-tenth of a second and there need be no pause in the crank handle motion. A series of "nines," however, will cause the zeroizing action to consume a longer time before the racks are all moved to their printing position. Where the invention is embodied in a machine having the extremely simple operating and timing mechanism herein described, the handle will have to be stopped in such a case until the action is completed.

Before the accumulator is disengaged from the racks a series of pawls 124 is rocked upwardly (Fig. 4) until they engage the underside of the racks 66 on which a series of notches 125 has been cut. The pawls are resiliently held in a comb-like structure 126 which is pivoted on a cross shaft 127 and has a lever arm 128 attached thereto. This prevents the racks from jumping forward when the accumulator is disengaged.

The rocking of the pawl structure 126 is accomplished by the free moving link 52, which is engaged and operated only during the read-out or total operation. A more detailed view of the mechanism in its operated position is shown in Fig. 15. The cam follower 48 first moves forward (to the left in Figs. 13 and 15) and the lug 51 raises the link 52 to the operating level. Then cam 43 rocks lever 46 and the half-pin 45 engages a hook 130 at the extremity of link 52 and draws the link toward the front of the machine. This action occurs only when the shaft 30 is being rotated in a counter-clockwise direction and the lever 117 is pulled toward the front of the machine.

Soon after the pawls 124 have engaged the notches 125 in the racks 66, in which position the racks are retained in their total position, the latches 93 are returned to their normal position by the bail 104 (220°). This normalizing action again provides detents for the accumulator wheels which are now raised (275°) out of mesh with the racks and then the rack bail 42 is moved to the rear of the machine picking up the racks in their total position and returning them to zero (280° to 350°).

Near the end of the travel of bail 42 the ratchet pawls 124 are disengaged and moved to their normal position. When this occurs the entire machine is normalized and ready for another adding or subtracting operation.

There is a period around mid-cycle when the racks 66 and type carriers 111 are set in accordance with the total, and at this time the type hammer latches 115 may be withdrawn in the usual way to print the total.

Attention is directed to the extreme simplicity of the accumulator control mechanism. The detents 93C engage the accumulator wheels instead of, as usual, the racks 66, and they are, in fact, the detents for holding said wheels in proper position when disengaged from the racks. The latch 98 is, therefore, the only addition to the movable parts in each order put in to bring about successive restoration of the wheels.

In some of the claims a tripping lever 93 and the latch 98 that is tripped by it are treated as being of the same denominational order as that numeral gear 76 which is locked by said tripping lever.

While I have described what I consider to be a highly desirable embodiment of my invention, it is obvious that many changes in form could be made without departing from the spirit of my invention, and I, therefore, do not limit myself to the exact form shown and described, nor to anything less than the whole of my invention as hereinbefore set forth, and as hereinafter claimed.

What I claim as new and desire to secure by Letters Patent is:

1. In a computing machine of the class described, having an accumulator with a tens carry mechanism of the crawl type, a numeral gear for each denominational order, a resultant gear for each denominational order, a zero stop on each resultant gear, a tripping lever in each order for controlling the zeroizing action of the resultant gears in sequential order, a rockable latch with means on one portion thereof for engaging part of the tripping lever in the next higher order and means on another portion thereof whereby said latch may be rocked into disengaging position by the tripping lever of the same order, and a bail for holding all of said tripping levers in a non-tripping position while amounts are being entered into said accumulator; said tripping lever comprising a detent portion for locking the numeral gear of like order, a stop arm for arresting the resultant gear in the next lower order, a lug for rocking said latch to release the next higher tripping lever, and an engageable portion adapted to be held by the latch in the next lower order.

2. In a computing machine of the class described, having an accumulator with a tens carry mechanism of the crawl type, a numeral gear for each denominational order, a resultant gear for each denominational order, a zero stop on each resultant gear, a tripping lever in each order for controlling the normalizing of the resultant gears in sequential order, a rockable latch with means on one portion thereof for engaging part of the tripping lever in the next higher order and means on another portion thereof whereby said latch may be rocked into disengaging position by the tripping lever of the same order, means for holding all of said tripping levers in a non-tripping position while amounts are being entered into said accumulator, and means for disabling said holding means when a total is to be read out of the machine, said tripping lever comprising a detent portion for locking the numeral gear of like order, a stop arm for arresting the resultant gear in the next lower order, a lug for rocking said latch to the disengaging position, and an engageable portion adapted to be held by the latch in the next lower order.

3. In a computing machine of the class described, having an accumulator with a tens carry mechanism of the crawl type, a numeral gear for each denominational order, a resultant gear for each denominational order, a zero stop on each resultant gear, a tripping lever in each order for controlling the normalizing of the resultant gears in sequential order, and a rockable latch with means on one portion thereof for engaging part of the tripping lever in the next higher order and means on another portion thereof whereby said latch may be rocked into disengaging position by the tripping lever of the same order; said tripping lever comprising a detent portion for locking the numeral gear of like order, a stop arm for arresting the resultant gear in the next lower order, a lug for rocking said latch to the disengaging position, and an engageable portion adapted to be held by the latch in the next lower order.

4. In a computing machine of the class described, having an accumulator with a tens carry mechanism of the crawl type, a numeral gear and a resultant gear for each denominational order, a zero stop on each resultant gear, a tripping lever in each order for controlling the sequential zeroizing of the resultant gears, and a rockable latch with means on one portion thereof for engaging part of the tripping lever in the next higher order and means on another portion thereof whereby said latch may be rocked into disengaging position by the tripping lever of the same order; said tripping lever comprising a detent for the numeral gear of the same order and a stop arm for stopping the resultant gear in the next lower order and a means for rocking said latch to disengaging position when said stop arm is engaged by said zero stop.

5. In a computing machine of the class described, having an accumulator with a tens carry mechanism of the crawl type, a numeral gear for each denominational order, a resultant gear for each denominational order, a notch cut in the periphery of each resultant gear, a tripping lever in each order for controlling the normalizing of the resultant gears in sequential order, a rockable latch with means on one portion thereof for engaging part of the tripping lever in the next higher order and means on another portion thereof whereby said latch may be rocked into disengaging position by the tripping lever of the same order; said tripping lever comprising a detent portion for locking the numeral gear of like order, an engageable portion adapted to be normally held by the latch in the next lower order and released when said latch is rocked, a stop arm for engaging the notch in the resultant gear in the next lower order, and a camming means for rocking said latch to the disengaging position.

6. In a computing machine having an accumulator of the crawl carry type, the combination of numeral gears and resultant wheels, one such gear and wheel in each denominational order, said resultant wheel having a circular periphery interrupted by a notch, a series of tripping levers, one arm of each said lever being a detent for the numeral gear of the higher of two consecutive orders and another arm of said lever being a stop for the resultant wheel of the lower of said two orders, a spring urging said detent out of and said stop into engaging position, a latch to hold said detent in and said stop out of engaging position, said circular periphery of the resultant wheel holding said stop out of and said detent in engaging position when released from said latch but descending into said notch when the resultant wheel comes to zero position, and means whereby each tripping lever releases the latch of the next tripping lever to the left thereof when said stop descends into said notch.

7. In a computing machine of the class described having an accumulator of the crawl carry type, the combination of a numeral gear for each order, a resultant wheel for each order said wheel having a circular periphery interrupted by a notch, a stop for each resultant wheel adapted to bear on the periphery thereof and to descend into said notch to arrest the wheel at zero, a detent to restrain each numeral gear against returning to zero, said stop in one order and said detent in the next higher order being connected to move together, the one into its notch and the other out of engagement with its gear, spring means urging said stop and detent to move as aforesaid, a series of latches one normally holding each said stop out of and said detent in engagement, and means to release each said latch when the detent of the lower of said two orders moves out of engagement.

8. In a computing machine of the class described having an accumulator of the crawl carry type, the combination of a numeral gear for each order, a resultant wheel for each order, said wheel having a circular periphery interrupted by a notch, a series of levers (93) one arm of each such lever being a detent to restrain a numeral gear against return rotation toward zero and another arm thereof being a stop to bear on the periphery of the resultant wheel of next lower order and to descend into said notch to arrest said wheel at zero, a spring urging said lever to rock said stop toward its said resultant wheel and said detent out of engagement with its said numeral gear, latches to restrain said levers against rocking as aforesaid, and means to trip each said latch when the lever (93) to the right of it rocks as aforesaid.

9. In a computing machine, the combination with an accumulator having actuator-actuated numeral wheels, resultant wheels and crawl-carry differential gearing, said resultant wheels comprising notched disks, of tripping levers spring urged toward said disks, and latches initially restraining said tripping levers in total taking, each of said tripping levers having one portion thereof initially preventing rotation of a numeral wheel and another portion thereof adapted to descend into the notch of the resultant wheel of next lower order but initially restrained by its latch, the rocking of said lever when it descends into said notch freeing the said numeral wheel and tripping the next latch to free the next tripping lever therefrom.

HAROLD P. MIXER.